March 25, 1952     J. A. ROBERTSON ET AL     2,590,272

ADJUSTABLE JET ORIFICE

Filed June 21, 1948

INVENTORS
JOHN A. ROBERTSON
EDWARD A. ROCK
BY

Reynolds Beach
ATTORNEYS

Patented Mar. 25, 1952

2,590,272

UNITED STATES PATENT OFFICE 2,590,272

ADJUSTABLE JET ORIFICE

John A. Robertson, Albuquerque, N. Mex., and Edward A. Rock, Mercer Island, Wash., assignors to Boeing Airplane Company, Seattle, Wash., a corporation of Delaware Application June 21, 1948, Serial No. 34,228

6 Claims. (Cl. 60—35.55)

This invention relates to an adjustable jet orifice of the type intended primarily for jet-propelled aircraft. The principal object of the invention is to devise an improved and efficient propulsion jet orifice having a variable orifice opening.

To a substantial degree the velocity of the jet stream may be governed by the area of the jet orifice since jet engines are generally constant-mass flow devices. If the area of the jet orifice is increased, the velocity of the jet stream, hence the thrust of the jet, is decreased, and vice versa. On take-off of the aircraft, for example, a larger thrust than normal is required, and may be attained by constricting the jet orifice. On the other hand, an increased orifice area may be desirable for operation at high cruising speed of of the aircraft where jet efficiency is primarily important. These and other factors well known in the art suggest the desirability of an adjustable jet orifice for jet propelled aircraft.

It follows, therefore, that, as an object of this invention, it is desirable to make provision in a simple manner for adjustment of the area of the jet orifice at will. While the variation of the orifice area should not be so great as to disturb the jet stream nor to obstruct it unduly, the variation, within the limits indicated, can be accomplished in a manner to vary the jet stream velocity over a substantial range, and thereby the engine performance may be conformed more flexibly to operating requirements or may be made as nearly efficient as possible under varying operating conditions.

Because of the tremendous thrust and exceedingly high temperatures developed in the jet stream, the problem of designing an adjustable jet orifice is made difficult. Any operating mechanism controlling orifice opening by movement of a stream-constricting member should in the preferred instance be located entirely out of contact with the hot gases. Otherwise it would be difficult for the parts to withstand the heat. Also the constricting member should be adjustable between maximum and minimum jet opening positions without any substantial variation in the force required to operate the control mechanism during such adjustments or without such force being great. Otherwise excessively heavy and powerful control equipment will be required. The provision of adjusting means to such ends is another object of this invention.

A further object is to devise a variable jet orifice which disturbs to the least extent the desired jet stream pattern in its positions either of maximum orifice opening or of minimum orifice opening. The orifice constricting means should be of a type which can be mounted in the simplest manner and without elaborate or bulky supporting parts. Moreover, the movement of such a member between maximum and minimum orifice opening positions should not be excessive in amount nor difficult to effectuate.

With these objects in view, a feature of the invention consists in a pair of relatively rotatable tubular members, one received within the other, and together defining the orifice opening. Each of the members has a constricted open end defined by corresponding orifice constricting lobes, angularly spaced about an axis which generally coincides with the core of the jet stream, which lobes, in the respective members, are registerable and deregisterable by progressive relative rotation of the members about their common axis to vary the jet orifice opening. With the lobes coincident the orifice opening is maximum, whereas relative rotation of the tubular members in angular amount equal to one-half the angular spacing between lobes produces minimum jet orifice opening.

Preferably, one of the tubular members comprises the main jet tube and is stationary. The other member comprises a skirt encircling the orifice end of the stationary tube. Both tubular members have correspondingly constricted open ends following generally the curvature of a spheroid, ellipsoid or other similar figure of revolution about the common axis of the tubular members. The term ellipsoid will be used herein as generic to all such rounded symmetrical surfaces or their equivalent. The actual orifice-defining apertures in each of the members is preferably oblong or elliptical, as formed, for example, by the intersection with the curved end-surfaces of the members of a cylinder whose axis intersects at right angles the common axis of the members. It will be understood, however, that other relatively rotatable tubular members and other forms of orifice-defining apertures could be used as well.

The objects and advantages of the invention and its various features will become further apparent from the following description and the accompanying drawing illustrating the preferred form of our improved adjustable jet orifice.

Figure 5:
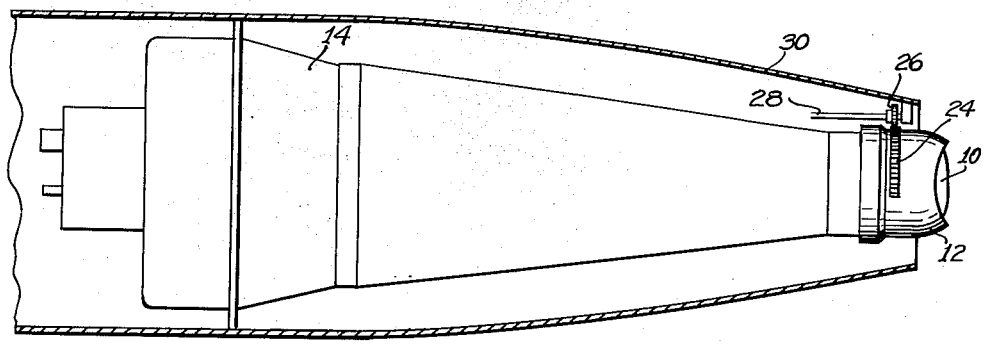
Figure 5 is a simplified view of a jet engine installation embodying the invention in its illustrated form.
Figure 1:
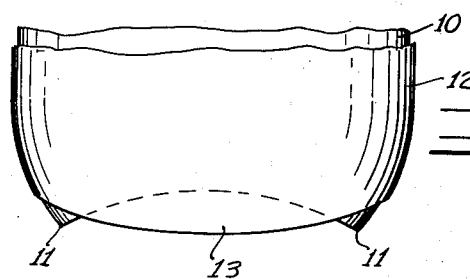
Figure 1 is a side view of the ends of cooperable tubular members defining a variable jet orifice.
Figure 2:
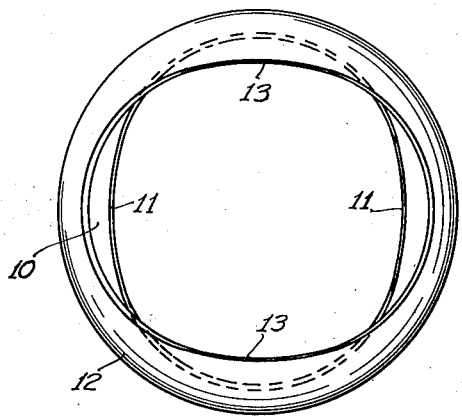
Figure 2 is an end view of the same, showing the members in minimum orifice opening position.

The relatively rotatable tubular members 10 and 12 are received one within the other for relative rotation about a common axis. Preferably the outer member 12 closely encircles the inner member 10 and is of similar shape. Both are formed at their orifice ends in a manner resembling an ellipsoidal zone, for example, using the term "ellipsoidal" in the meaning heretofore given it. The inwardly curved surfaces tending to close or constrict the orifice ends of the members are cut away or similarly apertured, together to define the orifice opening.

The orifice opening will be defined by the composite rim outline of the overlapping curved end-surfaces of the members 10 and 12. By providing each of these members with similarly spaced lobes or orifice constricting projections, maximum orifice opening may be obtained by relative rotation of the members until the lobes mutually overlap, and minimum orifice opening obtained when the lobes are completely out of registry and each contributes a constricting effect to the orifice opening. In the illustrated case the end apertures of the tubular members are formed by the intersection of a theoretical cylindrical surface and the curved end surfaces of the members, the cylinder's axis intersecting at right angles the common axis of the tubular members. The resulting apertures are oblong or generally elliptical in form, as shown, and the orifice constricting lobes formed by each of the members are two in number. The outer member 12 has opposing lobes 13, whereas the inner member has opposing lobes 11. Rotating the members relatively through 180 degrees or through 90 degrees and back causes the execution of a full cycle of variation in orifice opening between maximum and minimum opening positions.

If each of the tubular members 10 and 12 has three instead of two lobes, equally spaced about the rim or periphery of their orifice defining apertures, the full cycle of variation of orifice opening could be achieved by 120 degrees of progressive rotation or 60 degrees of rotation in one direction and then back to the initial position, one tubular member relative to the other.

Figure 3:
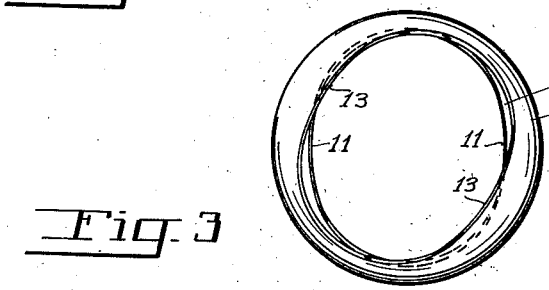
Figure 3 is an end view of the members in position intermediate to maximum and minimum orifice opening position.

It will be evident that any selected orifice opening may be achieved, between the extreme limits imposed by the constricting lobe areas of the tubular members, by adjusting the relative angular positions of the members. Figure 3 illustrates the members in a position of intermediate orifice opening, in which the lobes are perhaps 60 degrees out of registry in one direction of relative rotation of the tubular members 10 and 12.

Figure 4:
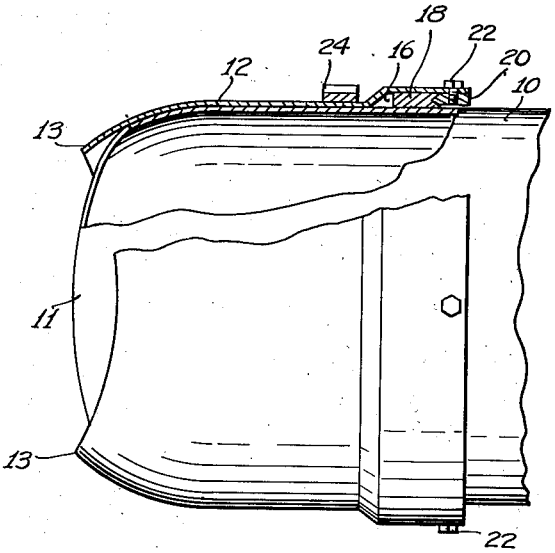
Figure 4 is a side elevation view partly in section of the exhaust end of an aircraft jet engine embodying an adjustable orifice of the present type.

In Figures 4 and 5, the inner tubular member 10 constitutes the projecting end of the main jet tube of the aircraft jet engine 14. The outer tubular member 12 constitutes a skirt closely encircling the end of the jet tube. The end of the tubular skirt 12 remote from its orifice end is enlarged or expanded into a flange to provide an annular recess 16 between it and the wall of the jet tube 10. In this recess is received an annular track 18 fixedly secured to the tube 10.

The track has a V-shaped groove around its edge remote from the jet orifice opening, in which is received a complementary shaped bearing ring 20 secured by bolts 22, or otherwise, to the flanged edge of the tubular skirt 12. The ring or track 18 thereby functions as a bearing support for the skirt 12 preventing the latter from flying off the end of the jet tube 10 under the force of the expelled gases striking the uncovered lobes of the skirt constricting the jet stream. Except for whatever variation may occur in the bearing friction between ring 20 and track 18 as a result of variations in total area of the skirt exposed to the jet stream, the force required to adjust the skirt will remain substantially uniform in all adjusted positions, and will not be unduly large. No supporting element obstructing the flow of gases through the jet tube and out the orifice exists. The gases merely encounter the gradual curvature of the formed ends of the skirt and tube constricting the gas stream. This causes no noticeable undesirable turbulence or disturbance in the pattern of the stream.

Rotation of the skirt 12 relative to the tube 10 is easily effected by means of a ring gear 24 mounted circumferentially on the skirt 12, and a coacting drive pinion 26 carried at the end of drive shaft 28 and suitably supported from the aircraft housing 30. The ring gear sector 24 need extend only 90° around the skirt, although it may extend around the entire periphery if it is desired to adjust the jet orifice by rotating the shaft 28 in only one direction to achieve the full range of adjustment of the orifice, or to effect rotation by coordinated rotation of several pinions 26 spaced about the skirt.

While a particular form of mounting and rotating means has been described, it will be understood that these are purely typical and that any convenient means of accomplishing the rotation of the one skirt relative to the other, without any projections into the interior, will serve equally well.

The advantages of such a variable jet orifice as applied to jet-propelled aircraft should now be evident. The orifice structure is exceedingly simple; no control parts are subjected to the high temperatures of the exhaust gas or subjected to the full force of the jet stream, and the installation and operation of the mechanism is exceedingly simple. The symmetrical and air stream shape of the constricting orifice in any of its adjusted positions is conducive to efficient jet operation while permitting obtaining the desired jet engine performance by varying the orifice opening at will, or automatically in accordance with any other control mechanism.

We claim as our invention:

1. An adjustable jet orifice for an aircraft jet engine, comprising a pair of generally cylindrical end-opening tubular jet-discharge members, one closely encircling the other, said members having approximately coterminous discharge end portions which gradually taper in diameter toward their terminal edges, the terminal edge of each such member defining a central discharge opening therein of noncircular form generally aligned longitudinally with that of the other member to define thereby a common gas exit, said members being relatively rotatable about their common longitudinal axis, and each such member having a terminal edge rim portion which in one relatively rotated position of the members partly overlaps, hence restricts, the discharge opening of the other member and thereby restricts the common exit opening, but in a different relatively rotated position of the members generally coincides with the corresponding rim portion of the other member, and thereby increases the common exit opening.

2. The adjustable jet orifice defined in claim 1, wherein the taper of the end portions of the tubular members increases progressively toward their discharge ends and further wherein the discharge openings of such members are generally oval in form and of approximately the same size.

3. The adjustable jet orifice defined in claim 2, wherein the tapered end portions of the tubular members are of generally ellipsoid sectional form.

4. The adjustable jet orifice defined in claim 3, wherein the rim edge of the discharge opening of each of the tubular members is contained in the surface of a cylinder the axis of which intersects the longitudinal axis of the members substantially at right angles.

5. The adjustable jet orifice defined in claim 1, wherein the outer tubular member rotates and the inner member is stationary, and annular thrust bearing means surrounding the inner tubular member and guiding the outer tubular member for rotation therearound, ring gear means on such outer tubular member at least partly surrounding the inner tubular member, and drive pinion means engaged with said ring gear means to effect rotational adjustment of the outer tubular member in relation to the inner tubular member.

6. A jet propulsion engine comprising an annular exhaust jet tube having a discharge end portion which tapers in diameter gradually to a noncircular generally central discharge opening, a correspondingly tapered skirt member closely encircling said exhaust end portion of the jet tube and guided for revolving relatively therearound, said skirt portion having a noncircular discharge end opening coinciding generally with the tube's discharge opening, and each of the tube and skirt having a discharge opening rim portion which partly overlaps and thereby restricts the discharge opening of the other in one rotationally adjusted position of the skirt relative to the tube, such rim portions being shaped and disposed to increase the effective jet discharge opening of the engine progressively by progressive rotational adjustment of such skirt relative to the tube away from said adjusted position, and means operable to effect progressive rotational adjustment of said skirt portion relative to said tube.

JOHN A. ROBERTSON.
EDWARD A. ROCK.

REFERENCES CITED

The following references are of record in the file of this patent:

UNITED STATES PATENTS

| Number | Name | Date |
| --- | --- | --- |
| 865,406 | Linker | Sept. 10, 1907 |
| 958,996 | Duc, Jr. | May 24, 1910 |
| 1,042,448 | Kane | Oct. 29, 1912 |
| 2,481,059 | Africano | Sept. 6, 1949 |